(12) United States Patent
Zhao et al.

(10) Patent No.: US 8,967,138 B2
(45) Date of Patent: Mar. 3, 2015

(54) SUPPORTING AND SHAPING DEVICE FOR MIRROR OF HELIOSTAT

(75) Inventors: Yulei Zhao, Shandong (CN); Jie Wang, Shandong (CN); Changjiang Zhang, Shandong (CN)

(73) Assignee: Himin Solar Co., Ltd., Shandong (CN)

( * ) Notice: Subject to any disclaimer, the term of this patent is extended or adjusted under 35 U.S.C. 154(b) by 310 days.

(21) Appl. No.: 13/388,520

(22) PCT Filed: Jul. 27, 2010

(86) PCT No.: PCT/CN2010/075477
§ 371 (c)(1),
(2), (4) Date: Mar. 7, 2012

(87) PCT Pub. No.: WO2011/015110
PCT Pub. Date: Feb. 10, 2011

(65) Prior Publication Data
US 2012/0162799 A1 Jun. 28, 2012
US 2015/0009588 A2 Jan. 8, 2015

(30) Foreign Application Priority Data

Aug. 5, 2009 (CN) .......................... 2009 1 0159996

(51) Int. Cl.
| | | |
|---|---|---|
| *F24J 2/08* | (2006.01) | |
| *F24J 2/10* | (2006.01) | |
| *F24J 2/52* | (2006.01) | |
| *G02B 7/182* | (2006.01) | |
| *G02B 7/183* | (2006.01) | |

(52) U.S. Cl.
CPC *F24J 2/1052* (2013.01); *F24J 2/52* (2013.01); *G02B 7/1822* (2013.01); *G02B 7/183* (2013.01); *Y02E 10/47* (2013.01); *F24J 2002/1014* (2013.01)
USPC ....................................... 126/684

(58) Field of Classification Search
USPC ................... 126/569, 683–703; 359/838–883
See application file for complete search history.

(56) References Cited

U.S. PATENT DOCUMENTS

RE30,027 E * 6/1979 Hockman ...................... 126/589
4,337,997 A * 7/1982 Sadoune et al. ............... 359/848

FOREIGN PATENT DOCUMENTS

| CA | 2 237 882 A1 | 1/2000 |
|---|---|---|
| CN | 101017033 A | 8/2007 |
| CN | 101187724 A | 5/2008 |
| CN | 101661153 A | 3/2010 |
| DE | 30 17 661 A1 | 11/1981 |

* cited by examiner

*Primary Examiner* — Jennifer L. Doak
(74) *Attorney, Agent, or Firm* — Tarolli, Sundheim, Covell & Tummino LLP

(57) ABSTRACT

The embodiment of the invention provides a supporting and a shape-regulating device for a reflector of a heliostat, which relates to the solar field. Said device is installed on the back of said reflector of said heliostat and fixed with a support of said heliostat, said supporting and shape-regulating device comprises a shape-regulating part for adjusting the curvature of said reflector and an adjusting part for adjusting the pitch and angle of said reflector; said shape-regulating part comprises at least four shape-regulating components, wherein at least one shape-regulating component is installed on a central sleeve of connection claws in the center of said reflector, the others are installed on the edge of said reflector and connected respectively with said central sleeve of connection claws through respective supporting arms of connection claws, said shape-regulating components comprise suckers and adjustable fasteners; said adjusting part is set up correspondingly on the side part of said center sleeve of connection claw, said adjusting part comprises a transition part and an adjusting fastener, said transition part is fixed with said support, said adjusting fastener is set up between said transition part and said center sleeve of connection claw. Thus, the invention has a simple structure and good adjusting effect, it is convenient to adjust, and easy to process and manufacture.

16 Claims, 4 Drawing Sheets

SUPPORTING AND SHAPING DEVICE FOR MIRROR OF HELIOSTAT

BACKGROUND OF THE INVENTION

1. Technical Field

The invention relates to a supporting and shape-regulating device, in particular to a supporting and shape-regulating device for a reflector of a heliostat used in high-temperature solar power generation.

2. Description of Related Art

Solar power generation technology, which converts solar energy into heat and then converts heat into electricity by focusing solar energy and collecting heat, is one of the most prospective solar energy utilization modes. The heliostat is used for focusing and reflecting sunlight.

The conventional heliostat is composed of a plurality of reflectors arranged and combined in a certain pattern. At present, the mirror faces of the reflectors in the heliostat are generally planes, and light is diverged after reflection and is difficult to focus. Therefore, each reflector needs to be adjusted to have a certain curvature, pitch, position and angle to ensure the whole heliostat focuses after adjustment.

Based on this, a four-point supporting and one-point stretching structure is adopted to adjust the glass curved surface of the reflector so as to ensure the light-gathering effect of the reflector. A heliostat with this structure can focus, however, since the four supporting points are used for both supporting and adjusting the position and angle at the same time, they are susceptible to mutual interference during installation, and adjustment is difficult. In addition, limited by the structure itself, spots are being adjusted only after the reflector is mounted on the support, so the adjustment speed is low, and batch installation and adjustment are affected.

Another structure, of which the reflector is pre-moulded by stretching and then mounted on a large-sized support, is also designed. The reflector is fixed on the large-sized support of a heliostat by 4 to 8 points after pre-moulding, so the multiple fixing points and the long distance between the fixing points lead to interference during installation, causing an increase of internal stress on the glass carriage and then influencing the reflection effect of the pre-moulded reflector.

As a consequence, the two structures mentioned above have the defects of complicated structure, huge processing difficulty, inconvenient to use, inconvenient to install and adjustment, and poor adjusting effect.

BRIEF SUMMARY OF THE INVENTION

To overcome the defects of the prior art, the invention provides a supporting and shape-regulating device for a reflector of a heliostat, which has a simple structure and an improved adjusting effect, convenient to adjust, and easy to process and manufacture.

To fulfil the above mentioned aim, the embodiment of the invention adopts a technical solution that: A supporting and shape-regulating device for a reflector of a heliostat, which is installed on the back of said reflector of said heliostat and fixed with a support of said heliostat, said supporting and shape-regulating device comprises a shape-regulating part for adjusting the curvature of said reflector and an adjusting part for adjusting the pitch and angle of said reflector; said shape-regulating part comprises at least four shape-regulating components, wherein at least one shape-regulating component is installed on a central sleeve of connection claws in the centre of said reflector, the others are installed on the edge of said reflector and connected respectively with said central sleeve of connection claws through respective supporting arm of connection claws, said shape-regulating components comprise suckers and adjustable fasteners; said adjusting part is set up correspondingly on the side part of said centre sleeve of connection claw, said adjusting part comprises a transition part and an adjusting fastener, said transition part is fixed with said support, said adjusting fastener is set up between said transition part and said centre sleeve of connection claw.

The embodiment of the invention has the following advantages: said supporting and shape-regulating device of the invention comprises a shape-regulating part and an adjusting part. By adjusting the bolt in the shape-regulating part, the curvature of the reflector is changed, so the aim of gathering light by the reflector is fulfilled. After the adjustment, fix the adjusted bolt, and the shape adjustment of the reflector unit ends. The superposition of the spots of all reflectors on each heliostat is then ensured by adjusting the pitch, position and angle of the reflector through the adjusting part. In comparison with the prior art, the invention adopts the structure that the shape-regulating part and the adjusting part of the reflector are adjusted separately. Thus, interference is reduced in the adjustment process, and it is convenient to use and easy to adjust; and experiments prove that light-gathering effect is better and the adjustment range of position and angle is wider.

Therefore, the invention has a simple structure and good adjusting effect, it is convenient to adjust, and easy to process and manufacture.

Figure 1:
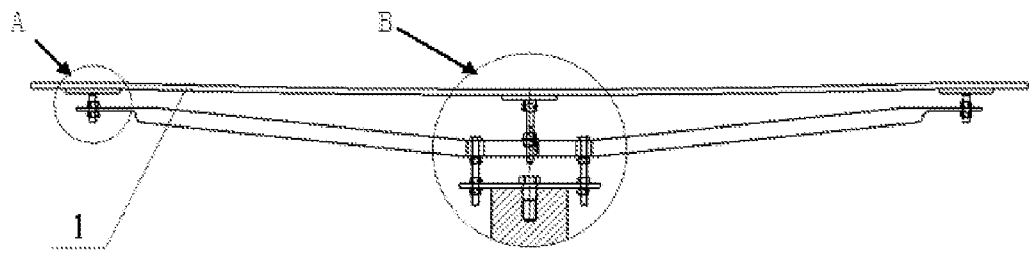
FIG. 1 illustrates an overall structure view of the supporting and shape-regulating device for the reflector of the heliostat in embodiment 1.

The drawing illustrates a reflector 1, a sucker 2, a nut 3, a bolt 4, a supporting arm of connection claw 5, a square central sleeve of connection claws 6, a shape-regulating sucker 7, a compression nut 8, a shape-regulating screw 9, an adjusting nut 10, a shape-regulating plate 11, an adjusting bolt 12, adhesive 13, a transition disc 14, a compression bolt 15, a support 16, a round central sleeve of connection claws 17, a spherical gasket 18, an adjusting disc 19, an adjusting bolt 20, and an adjusting nut 21.

DETAILED DESCRIPTION OF THE INVENTION

To make the object, technical solution and advantages of the invention clearer, the embodiment of the invention is further described in details with reference to the accompanying drawing.

Embodiment 1

As shown in FIG. 1 to FIG. 8, in embodiment 1 of said supporting and shape-regulating device for a reflector of a heliostat of the invention, said supporting and shape-regulating device is installed on the back of the reflector 1 of said heliostat and fixed with a support 16 of said heliostat. Said supporting and shape-regulating device comprises a shape-regulating part and an adjusting part. Said shape-regulating part is used for adjusting the curvature of said reflector 1. Said adjusting part is used for adjusting the pitch and angle of said reflector 1.

As shown in FIG. 1 to FIG. 4, said shape-regulating part in the embodiment comprises a central shape-regulating component and four peripheral shape regulating components. During implementation, four or more than four shape-regulating components can be set according to the size of the reflector.

Figure 4:
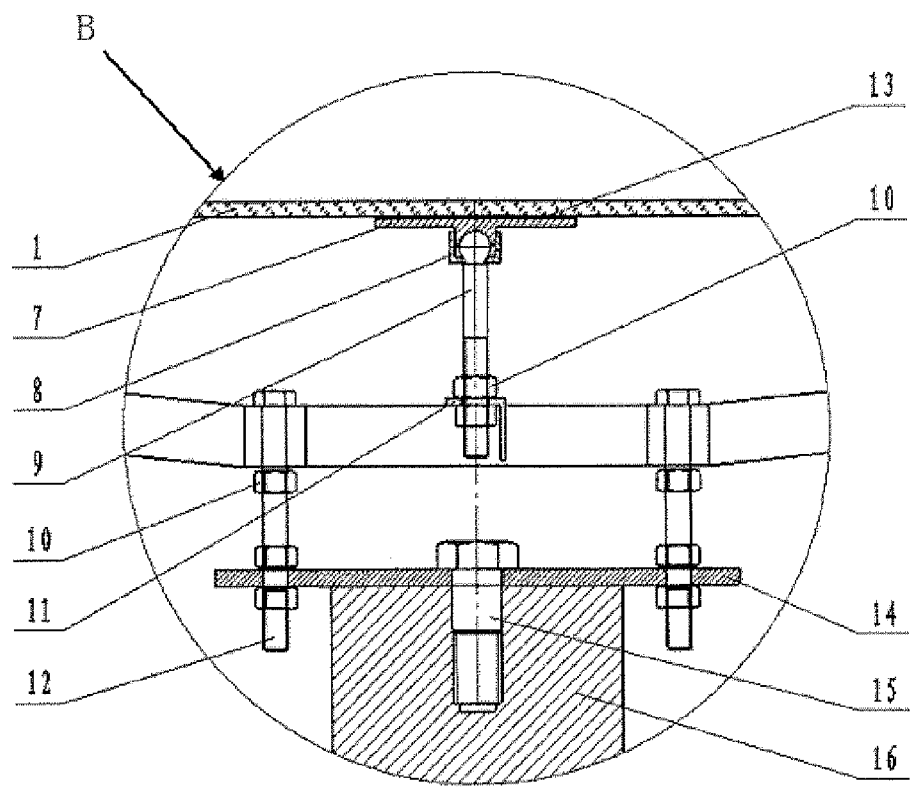
FIG. 4 illustrates a partial enlarged view of B in FIG. 1.
Figures 5, 6:
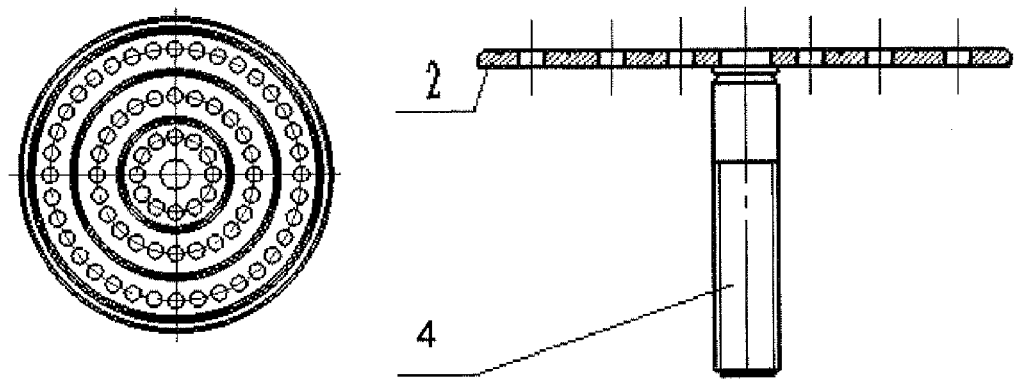
FIG. 5 illustrates a front view of said sucker in FIG. 1.
FIG. 6 illustrates a top view of FIG. 5.

As shown in FIG. 1 and FIG. 4, the central shape-regulating component installed on the square central sleeve of connection claws in the centre of said reflector 1 comprises a shape-regulating sucker 7 and adjustable fasteners. In this embodiment, said adjustable fasteners can be a compression nut 8, a shape-regulating screw 9 and an adjusting nut 10. It also can be a structure of a ball stud and a nut during implementation. In this embodiment, the screw end of the shape-regulating screw 9 is fixed on the square central sleeve of connection claws 6 by two adjusting nuts 10 and a shape-regulating plate 11, and the other end of the shape-regulating screw 9 is fixed on the shape-regulating sucker 7 by the compression nut 8. Particularly, the screw end of the shape-regulating screw 9 passes through the shape-regulating plate 11 and is fixed by two adjusting nuts 10 on each side of the shape-regulating plate 11. By rotating the adjusting nuts 10 on each side of the shape-regulating plate 11, the curvature of the reflector 1 is adjusted. In this embodiment, the shape-regulating plate 11 is made of angle steel. In addition, the screw end of the shape-regulating screw 9 can also be directly connected with the square central sleeve of connection claws 6, refer to embodiment 2 of the invention in FIG. 9. Both types of central shape-regulating components have the advantages of simple structure, convenient to adjust and low cost.

Figure 2:
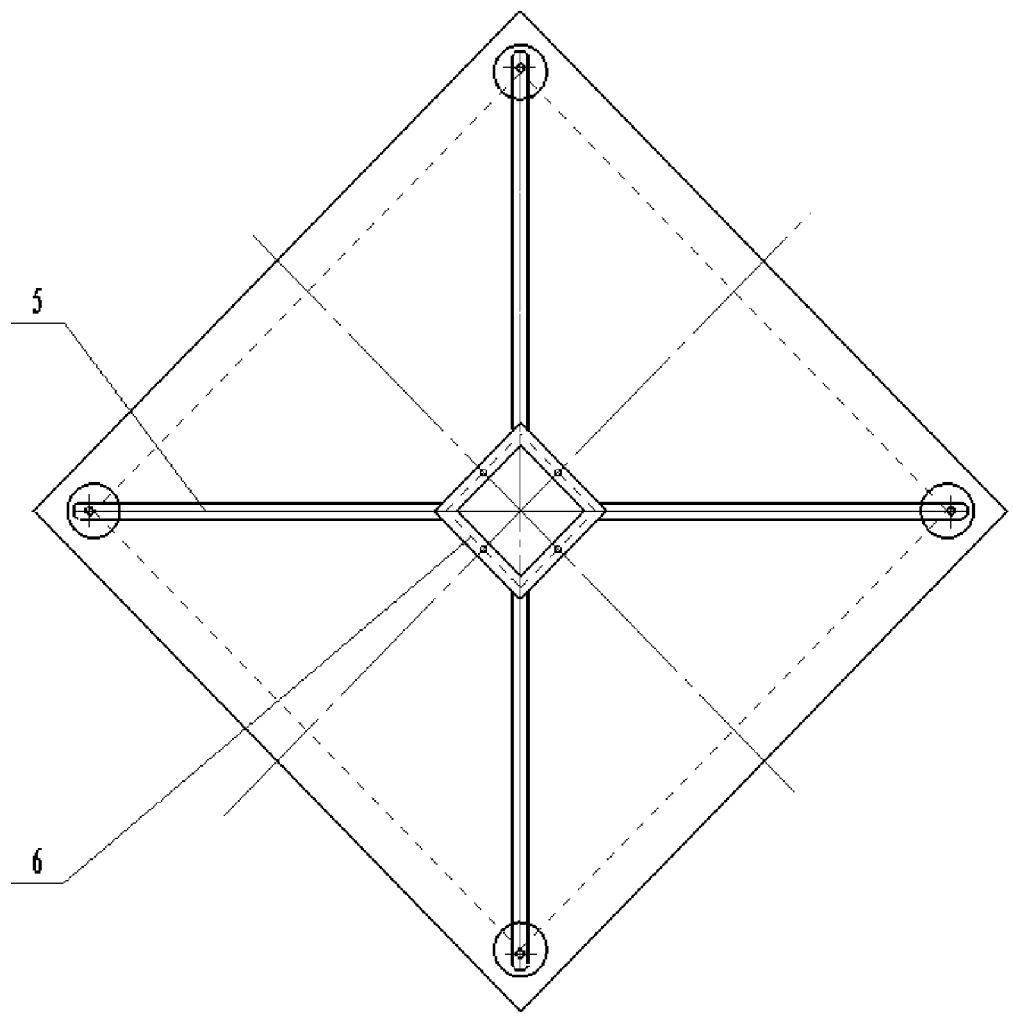
FIG. 2 Illustrates an upward view of the device with the transition disc and the support removed in the FIG. 1.
Figure 3:
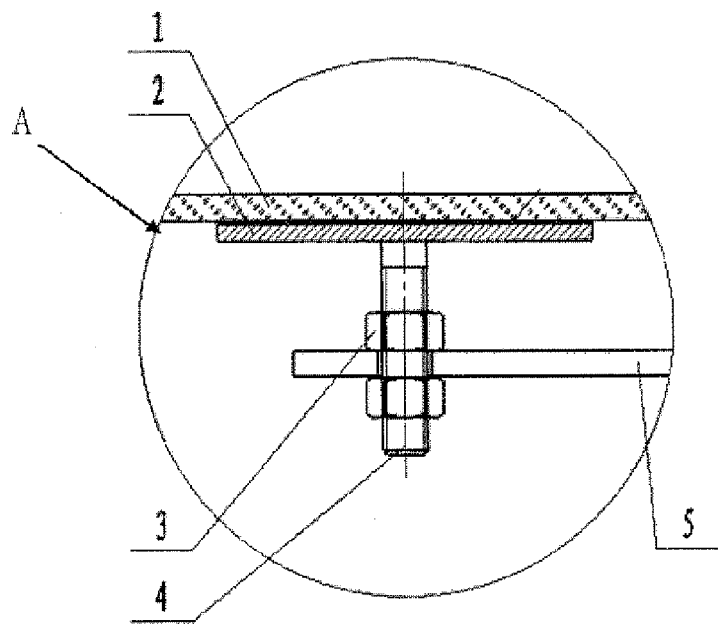
FIG. 3 illustrates a partial enlarged view of A in FIG. 1.

As shown in FIG. 1 and FIG. 2, the other four peripheral shape-regulating components are connected respectively to said square central sleeve of connection claws 6 through respective supporting arms of connection claws 5. Each peripheral shape-regulating component comprises a sucker 2 and adjustable fasteners. Said adjustable fasteners can be a bolt 4 and nuts 3. One end of the bolt 4 is connected to the sucker 2 (refer to FIG. 5 and FIG. 6), the other end of the bolt 4 passes through the supporting arm of connection claw 5 and is fixed by the nuts 3 which are set up on the two sides of the supporting arm of connection claw 5. By rotating nuts 3, fine tuning of the curvature of the reflector is realized.

Said supporting arm of connection claw 5 and said square central sleeve of connection claws 6 are welded, which can better ensure the strength of the connection claw and then ensure the regularity of reflection of plane of the reflector 1, so the light-gathering effect of the reflector 2 is achieved.

Figure 7:
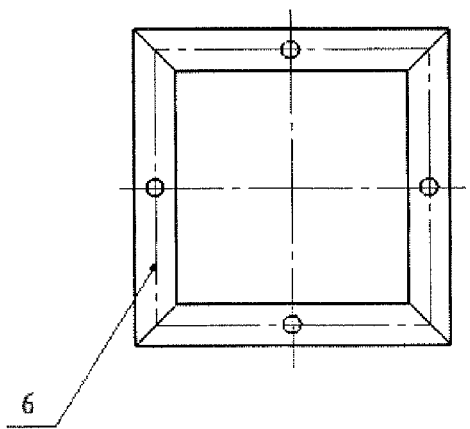
FIG. 7 illustrates a structure view of said square central sleeve of connection claws in FIG. 1.
Figure 8:
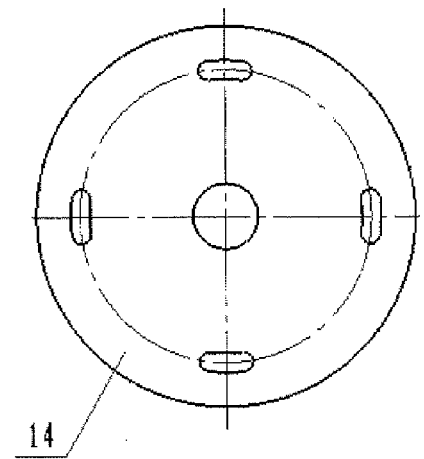
FIG. 8 illustrates a structure view of said transition plate in FIG. 1.

Said adjusting part correspondingly arranged on the outside part of the square central sleeve of connection claws 6 comprises a transition part and adjusting fasteners. In this embodiment, the adjusting fasteners adopts an adjusting bolt 12 and an adjusting nut 10, and can also adopt a structure of a ball stud and a nut in implementation. Particularly, as shown in FIG. 4, in this embodiment, said transition part is a transition disc 14 fixed on a support 16 by a compression bolt 15. As shown in FIG. 8, to facilitate installation, the transition disc 14 has four uniformly distributed crescents and a central round hole. The central round hole is used for fixing the compression bolt 15 and the support 16. In implementation, three or more than three crescents are formed according to the size of the transition disc 14. As shown in FIG. 7, said square central sleeve of connection claws 6 is formed by welding square steel, and has threaded holes to match with said crescents. The adjusting bolt 12 passes through said crescents and said threaded holes. The adjusting bolt 12 passes through the square central sleeve of connection claws 6 and the transition disc 14, and is locked by the adjusting nut 10. The adjusting bolt 12 is used both for fixing, and adjusting the position and angle, so the position and angle of the reflector 1 can be conveniently adjusted by adjusting the adjusting nut 10 at the lower end of the adjusting bolt 12.

During installation, the reflector 1 is placed on a plane, with the reflection surface facing down, and the sucker 2 is fixed by the adhesive 13. The shape-regulating plate 11 is installed on the square central sleeve of connection claws 6, and the square central sleeve of connection claws 6 is fixed together with the shape-regulating sucker 7, the shape-regulating screw 9 is adjusted according to the distance between the reflector 1 and a heat absorber to achieve the ideal curvature for the reflector, and then the adjusting nut 10 of the adjusting screw is fastened, so the reflection surface of the reflector 1 is fixed.

The transition disc 14 is fixed with the support 16 by the compression bolt 15. The adjusting bolt 12 is arranged and pre-fastened on the square central sleeve of connection claws, the four adjusting bolts 12 are arranged on the transition disc 14. Symmetrically screw the adjusting bolts 12 according to the spot position of the reflector unit. Adjust the vertical position of the spot by moving the adjusting bolt 12 up and down. Adjust the horizontal position of the spot by moving the adjusting bolt 12 left and right relative to the transition disc 14. Finally, all small spots on each heliostat are superposed, so the aim of gathering light efficiently is fulfilled.

Experiments prove that it only costs about 1 hour to mount and adjust said supporting and shape-regulating device and superpose the spots of all mirror units of a heliostat in the embodiment 1 of the invention. The efficiency is greatly improved comparing with 2 to 3 hours of average installation time in the prior art. By utilizing the invention, the size of a spot of a 100 m$^2$ heliostat, in a distance of 300 m, can be controlled in an area of 10 m$^2$. The quality of the spot is greatly improved and the generation of power is easier comparing with those of 16 m$^2$ in the prior art. In comparison with the prior art, the invention adopts the structure that the shape-regulating part and the adjusting part of the reflector are adjusted separately. Thus, interference is reduced in the adjustment process, and it is convenient to use and easy to adjust; and experiments prove that light-gathering effect is better and the adjustment range of position and angle is wider.

Embodiment 2

Figure 9:
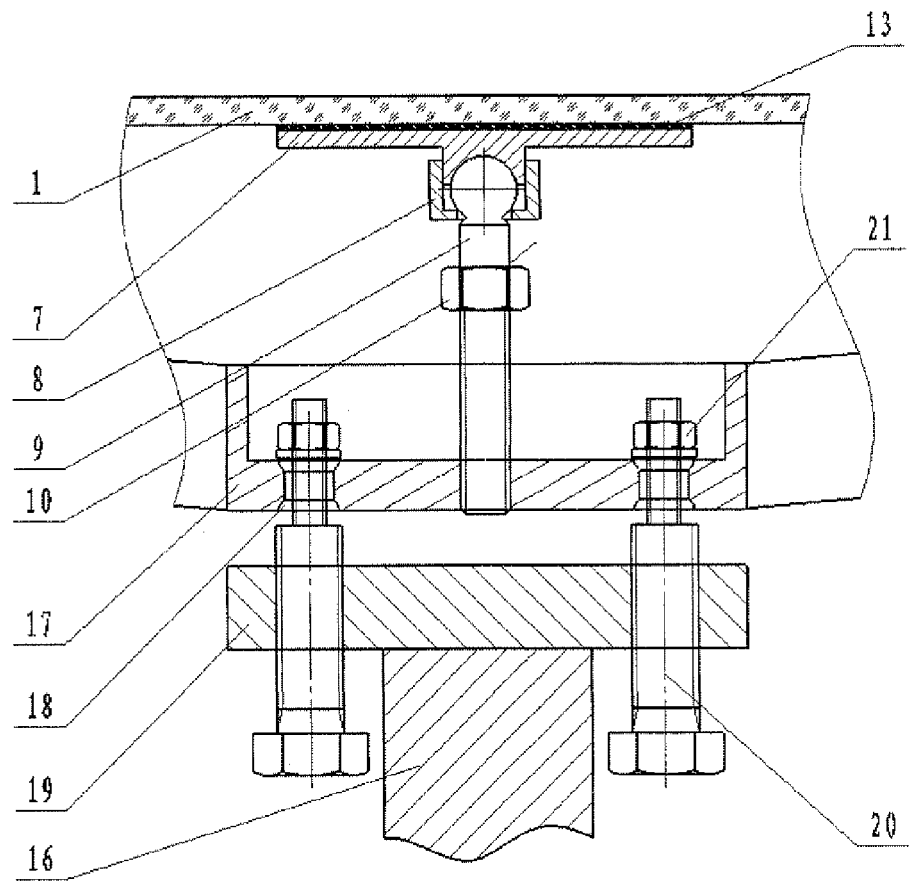
FIG. 9 illustrates a structure view of said adjusting structure in embodiment 2 of the invention.
Figures 10, 11:
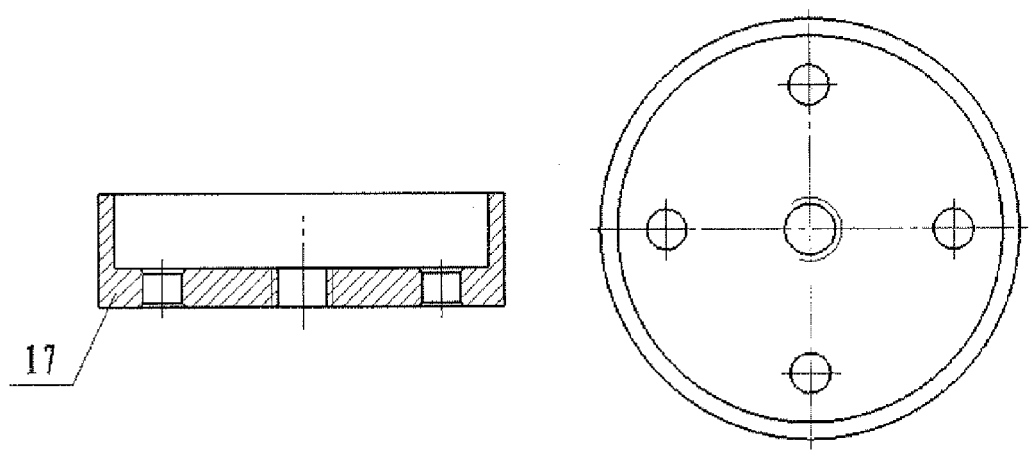
FIG. 10 illustrates a front view of said square centre sleeve of connection claws in FIG. 9.
FIG. 11 illustrates a top view of FIG. 10.

FIG. 9 to FIG. 11 illustrate the embodiment 2 of said supporting and shape-regulating device for the reflector of the heliostat of the invention, the embodiment 2 is different from the embodiment 1 in the aspect of the adjustment structure for adjusting position and angle, the identical structures are not described in this embodiment. As shown in FIG. 9, the adjustment structure in the embodiment 2 comprises a round central sleeve of connection claws 17, an adjusting disc 19 and an adjusting bolt 20. The adjusting disc 19 is fixed on the support 16, four threaded holes are uniformly distributed on the adjusting disc 19, one end of the adjusting bolt 20 is fixed on the round central sleeve of connection claws 17 through an adjusting nut 21 and a spherical gasket 18, and the position and angle of the reflector 1 can be very conveniently adjusted by screwing the other end of the adjusting bolt 20. The structure of said adjusting part in the embodiment 1 is also fit for the embodiment 2.

In conclusion, in the invention, the adjustment of the curvature of the reflector is separated with the adjustment of the position and angle, when compared with the prior art, the advantages of the invention include: the interference is reduced in the adjustment process, it is convenient to use, easy to adjust, easy to process, production cost is low, and experiments prove that the light-gathering adjustment effect is better.

The above-mentioned is the preferred embodiments of the invention, which are not used for limiting the invention. All modification, equivalent replacement and improvement etc. within the significance and principle of the invention shall belong to the protection range of the invention.

What is claimed is:

1. A supporting and shape-regulating device for a reflector of a heliostat, which is installed on the back of said reflector of said heliostat and fixed with a support of said heliostat, said supporting and shape-regulating device comprises:
    a shape-regulating part for adjusting the curvature of said reflector; and
    an adjusting part for adjusting the pitch and angle of said reflector;
    wherein said shape-regulating part comprises at least four shape-regulating components, wherein at least one shape-regulating component is installed on a central sleeve of connection claws in the center of said reflector, the others are installed on the edge of said reflector and connected respectively with said central sleeve of connection claws through respective supporting arms of connection claws, said central sleeve of connection claws and said supporting arm of connection claws being individual pieces which are joined together, said shape-regulating components comprise suckers and adjustable fasteners and said adjusting part is set up correspondingly on the side part of said central sleeve of connection claw, said adjusting part comprises a transition part and an adjusting fastener, said transition part is fixed with said support, said adjusting fastener is set up between said transition part and said central sleeve of connection claw.

2. The supporting and shape-regulating device for a reflector of a heliostat according to claim 1, wherein the adjustable fasteners in said shape-regulating components comprises bolts and nuts.

3. The supporting and shape-regulating device for a reflector of a heliostat according to claim 1, wherein the adjusting fastener in said adjusting part comprises a bolt and a nut.

4. The supporting and shape-regulating device for a reflector of a heliostat according to claim 1, wherein said central sleeve of connection claw is square or round.

5. The supporting and shape-regulating device for a reflector of a heliostat according to claim 1, wherein the transition in part in said adjusting part is a transition disc fixed with said support through a compression bolt, at least three crescents are uniformly distributed on said transition disc, threaded holes matched with said crescents are formed on corresponding central sleeve of connection claw, said adjusting fastener passes through said crescents and said threaded holes.

6. The supporting and shape-regulating device for a reflector of a heliostat according to claim 2, wherein the transition part in said adjusting part is a transition disc fixed with said support through a compression bolt, at least three crescents are uniformly distributed on said transition disc, threaded holes matched with said crescents are formed on corresponding central sleeve of connection claw, said adjusting fastener passes through said crescents and said threaded holes.

7. The supporting and shape-regulating device for a reflector of a heliostat according to claim 3, wherein the transition part in said adjusting part is a transition disc fixed with said support through a compression bolt, at least three crescents are uniformly distributed on said transition disc, threaded holes matched with said crescents are formed on corresponding central sleeve of connection claw, said adjusting fastener passes through said crescents and said threaded holes.

8. The supporting and shape-regulating device for a reflector of a heliostat according to claim 4, wherein the transition part in said adjusting part is a transition disc fixed with said support through a compression bolt, at least three crescents are uniformly distributed on said transition disc, threaded holes matched with said crescents are formed on corresponding central sleeve of connection claw, said adjusting fastener passes through said crescents and said threaded holes.

9. A supporting and shape-regulating device for a reflector of a heliostat, which is installed on the back of said reflector of said heliostat and fixed with a support of said heliostat, said supporting and shape-regulating device comprises:
    a shape-regulating part for permitting adjustment of the curvature of said reflector; and
    an adjusting part for permitting adjustment of the pitch and angle of said reflector;
    wherein said shape-regulating part comprises at least four shape-regulating components, wherein at least one shape-regulating component is installed on a central sleeve of connection claws in the center of said reflector, said central sleeve being spaced away from the back of said reflector, the others of said shape-regulating components being installed near the edge of said reflector and connected respectively with said central sleeve of connection claws through respective supporting arms of connection claws, said supporting arms being spaced away from the back of said reflector, said shape-regulating components comprise spaced apart suckers secured to the back of said reflector and adjustable fasteners, and wherein said adjusting part is set up correspondingly on the side part of said central sleeve of connection claw, said adjusting part comprises a transition part and an adjusting fastener, said transition part is fixed with said support, said adjusting fastener is set up between said transition part and said central sleeve of connection claw.

10. The supporting and shape-regulating device for a reflector of a heliostat according to claim 9, wherein the adjustable fasteners in said shape-regulating components comprises bolts and nuts.

11. The supporting and shape-regulating device for a reflector of a heliostat according to claim 9, wherein the adjusting fastener in said adjusting part comprises a bolt and a nut.

12. The supporting and shape-regulating device for a reflector of a heliostat according to claim 9, wherein said central sleeve of connection claw is square or round.

13. The supporting and shape-regulating device for a reflector of a heliostat according to claim 9, wherein the transition in part in said adjusting part is a transition disc fixed with said support through a compression bolt, at least three crescents are uniformly distributed on said transition disc, threaded holes matched with said crescents are formed on corresponding central sleeve of connection claw, said adjusting fastener passes through said crescents and said threaded holes.

14. The supporting and shape-regulating device for a reflector of a heliostat according to claim 10, wherein the transition part in said adjusting part is a transition disc fixed with said support through a compression bolt, at least three crescents are uniformly distributed on said transition disc, threaded holes matched with said crescents are formed on corresponding central sleeve of connection claw, said adjusting fastener passes through said crescents and said threaded holes.

15. The supporting and shape-regulating device for a reflector of a heliostat according to claim 11, wherein the transition part in said adjusting part is a transition disc fixed with said support through a compression bolt, at least three crescents are uniformly distributed on said transition disc, threaded holes matched with said crescents are formed on corresponding central sleeve of connection claw, said adjusting fastener passes through said crescents and said threaded holes.

16. The supporting and shape-regulating device for a reflector of a heliostat according to claim 12, wherein the transition part in said adjusting part is a transition disc fixed with said support through a compression bolt, at least three crescents are uniformly distributed on said transition disc, threaded holes matched with said crescents are formed on corresponding central sleeve of connection claw, said adjusting fastener passes through said crescents and said threaded holes.

* * * * *